(12) United States Patent
Grandhee

(10) Patent No.: US 6,579,928 B2
(45) Date of Patent: Jun. 17, 2003

(54) WATERBORNE PRIMER WITH IMPROVED CHIP RESISTANCE

(75) Inventor: Sunitha Grandhee, Novi, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 10/007,879

(22) Filed: Dec. 6, 2001

(65) Prior Publication Data

US 2002/0042469 A1 Apr. 11, 2002

Related U.S. Application Data

(63) Continuation of application No. 09/442,420, filed on Nov. 17, 1999, now Pat. No. 6,342,558.

(51) Int. Cl.$^7$ ................................................. C08K 3/00
(52) U.S. Cl. ...................................... 524/457; 524/507
(58) Field of Search ................................ 524/457, 507

(56) References Cited

U.S. PATENT DOCUMENTS

| | | | |
|---|---|---|---|
| 4,948,829 A | 8/1990 | Mitsuji et al. .................. 524/4 |
| 4,954,559 A | 9/1990 | Hartog ........................ 524/507 |
| 4,978,708 A | 12/1990 | Fowler et al. ............... 524/507 |
| 5,011,881 A | 4/1991 | Fujii et al. ................... 524/457 |
| 5,141,983 A | 8/1992 | Hasegawa et al. .......... 524/457 |
| 5,227,422 A | 7/1993 | Mitsuji et al. .............. 524/457 |
| 5,281,655 A | 1/1994 | Mitsuji et al. .............. 524/507 |
| 5,314,942 A | 5/1994 | Coogan et al. ............. 524/457 |
| 5,397,646 A | 3/1995 | Nickle ...................... 428/423.1 |
| 5,492,273 A | 2/1996 | Temple et al. ............ 427/407.1 |
| 5,586,384 A | 12/1996 | Newman ...................... 29/596 |
| 5,589,543 A | 12/1996 | Yokelson .................... 525/131 |
| 5,591,820 A | 1/1997 | Kydonieus ................... 528/76 |
| 5,670,600 A | 9/1997 | Nienhaus ..................... 528/75 |
| 5,739,194 A | 4/1998 | Natesh et al. ............... 524/457 |
| 5,817,735 A | 10/1998 | Hatch et al. .................. 528/84 |
| 5,854,332 A | 12/1998 | Swarup et al. ............. 524/507 |
| 5,876,802 A | 3/1999 | Brunnemann ............... 427/409 |
| 5,993,911 A | 11/1999 | Brenke .................... 427/407.1 |

OTHER PUBLICATIONS

Abstract of Kansai, "Polyester–polyurethane compositions as chipping–resistant automotive primers", JP 63–122768, filed on May 1998.

*Primary Examiner*—Edward J. Cain
(74) *Attorney, Agent, or Firm*—Anna M. Budde

(57) ABSTRACT

The invention provides a thermosetting aqueous primer composition that includes a dispersed polyurethane polymer, an acrylic polymer emulsion polymerized in the presence of the polyurethane dispersion, and a crosslinking component that is reactive with at least one of the polyurethane polymer and the acrylic polymer. The polyurethane polymer has a glass transition temperature of 0° C. or less. The acrylic polymer has a glass transition temperature that is at least about 20° C. higher than the glass transition temperature of polyurethane resin. The invention further provides a composite coating having as a primer layer a cured layer of the primer composition of the invention and having at least one topcoat layer.

4 Claims, No Drawings

WATERBORNE PRIMER WITH IMPROVED CHIP RESISTANCE

CROSS-REFERENCE TO RELATED APPLICATION

The present application is a continuation of U. S. Ser. No. 09/442,420, filed on Nov. 17, 1999, now 6,342,558 which is incorporated herein by reference.

FIELD OF THE INVENTION

The present invention relates to aqueous crosslinkable primer coating compositions and particularly such primer compositions that combine aqueous polyurethane dispersions and aqueous acrylic dispersions. The present invention further relates to composite coating finishes having one or more primer layers and one or more topcoat layers.

BACKGROUND OF THE INVENTION

Coating finishes, particularly exterior coating finishes in the automotive industry, are generally applied in two or more distinct layers. One or more layers of primer coating composition may be applied to the unpainted substrate first, followed by one or more topcoat layers. Each of the layers supplies important properties toward the durability and appearance of the composite coating finish. The primer coating layers may serve a number of purposes. First, the primer coating may be applied in order to promote adhesion between the substrate and the coating. Secondly, the primer coating may be applied in order to improve physical properties of the coating system, such as corrosion resistance or impact strength, especially for improving resistance to gravel chipping. Third, the primer coating may be applied in order to improve the appearance of the coating by providing a smooth layer upon which the topcoat layers may be applied. The topcoat layer or layers contribute other properties, such as color, appearance, and light stabilization.

In the process of finishing the exterior of automobiles today, metal substrates are usually first coated with an electrocoat primer. While the electrocoat primer provides excellent surface adhesion and corrosion protection, it is often desirable to apply a second primer layer. The second primer layer provides additional properties not available from the electrocoat primer. Resistance to gravel chipping is one of the critical properties provided by the second primer layer. The second primer layer may also enhance the corrosion protection of the finish and provide a smoother surface than the electrocoat primer. The second primer also serves to provide a barrier layer between the electrocoat primer layer, which usually contains aromatic moieties and other materials that can cause yellowing on exposure to sunlight, and the topcoat.

Several references disclose generally a process in which one or more ethylenically unsaturated monomers are emulsion polymerized in the presence of a dispersed polyurethane resin. Examples are Guagliardo, U.S. Pat. No. 4,318,833, which teaches that a coating composition using a polyurethane/acrylic emulsion so prepared provides a coating with better gloss, with preference given to aliphatic diisocyanates for better color stability; Kaizerman et al., U.S. Pat. No. 4,198,330, which teaches that vinyl polymer-modified polyurethane dispersion provides improved strength to a coating, compared to the polyurethane dispersion alone; Swarup et al., U.S. Pat. No. 5,854,332, which teaches using a branched polyurethane polymer for improved metallic pigment orientation and for good adhesion following humidity exposure in a basecoat coating; and Natesh et al., U.S. Pat. No. 5,739,194, which teaches preparing the polyurethane polymer with a particular combination of polyisocyanates to provide good adhesion of a coating following humidity exposure in a basecoat coating. These patents are incorporated herein in their entirety by reference. These patents do not discuss primer compositions or compositions that would provide resistance to stone chipping and other important properties for primers.

Hatch et al., U.S. Pat. No. 5,817,735, incorporated herein by reference, discloses an aqueous primer composition for golf balls that includes a polyurethane dispersion and an acrylic dispersion. The primer has a very low content of volatile organic solvent, which is important for minimizing regulated emissions from the coating process. The Hatch patent, however, does not disclose a curable (thermosetting) composition and does not disclose preparing a dispersion in which the acrylic polymer is associated with the polyurethane polymer. More importantly, the golf ball primers of the Hatch patent do not provide the properties, such as resistance to stone chipping and corrosion protection, that are required of an automotive primer.

It would be desirable, therefore, to have a primer composition that provides improved resistance to stone chipping and other properties that are important for an automotive primer, which additionally can be formulated with a very low content of volatile organic solvent.

SUMMARY OF THE INVENTION

The present invention provides a thermosetting primer composition that includes a polyurethane polymer, an acrylic polymer that is polymerized in the presence of at least a part of the polyurethane polymer, and a crosslinking component that is reactive with at least one of the polyurethane polymer and the acrylic polymer. The polyurethane polymer has a glass transition temperature of 0° C. or less. The acrylic polymer has a glass transition temperature that is at least about 20° C. higher than the glass transition temperature of polyurethane resin. The polyurethane and acrylic polymers are preferably dispersed or emulsified in an aqueous medium. As used herein, "emulsion" or "dispersion" will each be used to refer both to dispersions and emulsions.

The invention further provides a composite coating having as a primer layer a cured layer of the primer composition of the invention and having at least one topcoat layer.

DETAILED DESCRIPTION OF THE INVENTION

The polyurethane polymer of the invention has a glass transition temperature of about 0° C. or less, preferably about −20° C. or less, and more preferably about −30° C. or less. The glass transition temperature of the polyurethane of the invention is in the range of from about −80° C. to about 0° C., more preferably from about −65° C. to about −10° C., still more preferably from about −65° C. to about −30° C., and even still more preferably from about −60° C. to about −35° C.

The weight average molecular weight of the polyurethane is preferably from about 15,000 to about 60,000, more preferably from about 15,000 to about 60,000, and even more preferably from about 20,000 to about 35,000.

Polyurethanes are prepared by reaction of at least one polyisocyanate and at least one polyol. The reactants used to prepare the polyurethane are selected and apportioned to provide the desired glass transition temperature. Suitable polyisocyanates include, without limitation, aliphatic linear and cyclic polyisocyanates, preferably having up to 18 carbon atoms, and substituted and unsubstituted aromatic polyisocyanates. Illustrative examples include, without limitation, ethylene diisocyanate, 1,2-diisocyanatopropane, 1,3-diisocyanatopropane, 1,4-butylene diisocyanate, lysine diisocyanate, 1,4-methylene bis(cyclohexyl isocyanate), isophorone diisocyanate, toluene diisocyanates (e.g., 2,4-toluene diisocyanate and 2,6-toluene diisocyanate) diphenylmethane 4,4'-diisocyanate, methylenebis-4,4'-isocyanatocyclohexane, 1,6-hexamethylene diisocyanate, p-phenylene diisocyanate, tetramethyl xylene diisocyanate, meta-xylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, and combinations of two or more of these. Biurets, allophonates, isocyanurates, carbodiimides, and other such modifications of these isocyanates can also be used as the polyisocyanates. In a preferred embodiment, the polyisocyanates include methylenebis-4,4'-isocyanatocyclohexane, 1,6-hexamethylene diisocyanate, 1,12-dodecamethylene diisocyanate, and combinations thereof. It is particularly preferred to use at least one α,ω-alkylene diisocyanate having four or more carbons, preferably 6 or more carbons, in the alkylene group. Combinations of two or more polyisocyanates in which one of the polyisocyanates is 1,6-hexamethylene diisocyanate are especially preferred.

The polyol or polyols used to prepare the polyurethane polymer can be selected from any of the polyols known to be useful in preparing polyurethanes, including, without limitation, 1,4-butanediol, 1,3-butanediol, 2,3-butanediol, 1,6-hexanediol, neopentyl glycol, 1,3-propanediol, 1,5-pentanediol, 1,6-hexanediol, 1,9-nonanediol, ethylene glycol, diethylene glycol, triethylene glycol and tetraethylene glycol, propylene glycol, dipropylene glycol, glycerol, cyclohexanedimethanols, 2-methyl-2-ethyl-1,3-propanediol, 2-ethyl-1,3-hexanediol, thiodiglycol, 2,2,4-trimethyl-1,3-pentanediol, cyclohexanediols, trimethylolpropane, trimethylolethane, and glycerin; polyester polyols such as the reaction products of any of the foregoing alcohols and combinations thereof with one or more polycarboxylic acids selected from malonic acid, maleic acid, succinic acid, glutaric acid adipic acid, azelaic acid, anhydrides thereof, and combinations thereof; polyether polyols, such as polyethylene glycols and polypropylene glycols; and combinations of such polyols. Polyols having two hydroxyl groups are preferred. The polyurethane is preferably prepared using one or more polyester polyols. In a preferred embodiment, the polyester polyol is the reaction product of a mixture that comprises neopentyl glycol and adipic acid.

While it is possible to prepare a nonionic dispersion of the polyurethane, the polyurethane dispersion is preferably anionic. Acid-functional polyurethanes that can be salted to form anionic dispersions or emulsions may be synthesized by including a monomer having acid functionality, such as, without limitation, dialkylpropionic acids including dimethylolpropionic acid, and alkali metal salts of amino acids such as taurine, methyl taurine, 6-amino caproic acid, glycine, sulfanilic acid, diamino benzoic acid, ornithine, lysine and 1:1 adducts of sultones, such as propane sultone or butane sultone, with diamines, such as ethylene diamine, hydrazine, or 1,6-hexamethylene diamine. The hydroxyl groups react to form the urethane linkages while the acid group remains unreacted in the polyurethane polymerization.

Suitable polyurethane polymers can be prepared by any of the known methods, such as the methods disclosed in the Guagliardo, Kaizerman et al., Swarup et al., and Natesh et al. patents incorporated above, and in Honig et al., incorporated herein in its entirety by reference. In one method for preparing polyurethane polymers, the polyisocyanate component is reacted with an excess of equivalents of the polyol component to form a hydroxyl-functional polyurethane polymer. Alternatively, an excess of equivalents of the polyisocyanate component can be reacted with the polyol component to form an isocyanate-functional prepolymer. The prepolymer can then be reacted further in different ways. First, the prepolymer can be reacted with a mono-functional alcohol or amine to provide a non-functional polyurethane polymer. Examples of mono-functional alcohols and amines that may be used include polyethylene oxide compounds having one terminal hydroxyl group, lower mono-functional alcohols having up to 12 carbon atoms, amino alcohols such as dimethylethanolamine, and secondary amines such as diethylamine and dimethylamine. Secondly, the prepolymer can be reacted with a polyfunctional polyol, polyamine, or amino alcohol compound to provide reactive hydrogen functionality. Examples of such polyfunctional compounds include, without limitation, the polyols already mentioned above, including triols such as trimethylolpropane; polyamines such as ethylenediamine, butylamine, and propylamine; and amino alcohols, such as diethanolamine. Finally, the prepolymer can be chain extended by the water during emulsification or dispersion of the prepolymer in the aqueous medium. The prepolymer is mixed with the water after or during neutralization.

The polyurethane may be polymerized without solvent. Solvent may be included, however, if necessary, when the polyurethane or prepolymer product is of a high viscosity. If solvent is used, the solvent may be removed, partially or completely, by distillation, preferably after the polyurethane is dispersed in the water. The polyurethane may have nonionic hydrophilic groups, such as polyethylene oxide groups, that serve to stabilize the dispersed polyurethane polymer. In a preferred embodiment, however, the polyurethane polymer is prepared with pendant acid groups as described above, and the acid groups are partially or fully salted with an alkali, such as sodium or potassium, or with a base, such as an amine, before or during dispersion of the polyurethane polymer or prepolymer in water.

The primer composition further includes an acrylic polymer. The acrylic polymer is prepared by emulsion polymerization in the presence of at least a part of the aqueous polyurethane dispersion. While the acrylic polymer may be polymerized in the presence of all of the polyurethane polymer, it may be advantageous in some instances to add a part of the polyurethane polymer after the emulsion polymerization of the acrylic, for example when a part of the polyurethane dispersion is used to prepare a pigment paste for the primer composition.

The acrylic polymer is polymerized from a monomer mixture that preferably includes an active hydrogen-functional monomer and preferably includes an acid-functional monomer. Examples of active hydrogen-functional monomers include, without limitation, hydroxyl-functional monomers such as hydroxyethyl acrylate, hydroxyethyl methacrylate, hydroxypropyl acrylate, hydroxypropyl methacrylate, hydroxybutyl acrylates, and hydroxybutyl methacrylates; and carbamate- and urea-functional monomers or monomers with functional groups that are converted to carbamate or urea groups after polymerization such as, without limitation, those disclosed in U.S. Pat. No. 5,866,259, "Primer Coating Compositions Containing Carbamate-Functional Acrylic Polymers," the entire disclosure of which is incorporated herein by reference. Preferably, a sufficient amount of active hydrogen-functional monomer is included to produce an equivalent weight of 1000 or less grams per equivalent, more preferably 800 or less grams per equivalent, and even more preferably 600 or less grams per equivalent.

In one preferred embodiment, the acrylic polymer forms an anionic dispersion. Examples of suitable acid-functional monomers include, without limitation, αβ-ethylenically unsaturated monocarboxylic acids containing 3 to 5 carbon atoms, αβ-ethylenically unsaturated dicarboxylic acids containing 4 to 6 carbon atoms and the anhydrides and monoesters of these. Examples include, without limitation, acrylic acid, methacrylic acid, crotonic acid, maleic acid or maleic anhydride, itaconic acid or itaconic anhydride, and so on. A sufficient amount of acid-functional monomer is included to produce an acrylic polymer with an acid number of at least about 1, and preferably the acrylic polymer has an acid number of from about 1 to about 10.

In addition to the ethylenically unsaturated monomer having acid functionality or used to generate acid functionality in the finished polymer, one or more other ethylenically unsaturated monomers are employed as comonomers in forming the acrylic resins of the invention. Examples of such copolymerizable monomers include, without limitation, derivatives of α,β-ethylenically unsaturated monocarboxylic acids containing 3 to 5 carbon atoms, including esters, nitrites, or amides of those acids; diesters of α,β-ethylenically unsaturated dicarboxylic acids containing 4 to 6 carbon atoms; vinyl esters, vinyl ethers, vinyl ketones, vinyl amides, and aromatic or heterocyclic aliphatic vinyl compounds. Representative examples of acrylic and methacrylic acids, amides and aminoalkyl amides include, without limitation, such compounds as acrylamide, N-(1,1-dimethyl-3-oxobutyl)-acrylamide, N-alkoxy amides such as methylolamides; N-alkoxy acrylamides such as n-butoxy acrylamide; N-aminoalkyl acrylamides or methacrylamides such as aminomethylacrylamide, 1-aminoethyl-2-acrylamide, 1-aminopropyl-2-acrylamide, 1-aminopropyl-2-methacrylamide, N-1-(N-butylamino)propyl-(3)-acrylamide and 1-aminohexyl-(6)-acrylamide and 1-(N,N-dimethylamino)-ethyl-(2)-methacrylamide, 1-(N,N,dimethylamino)-propyl-(3)-acrylamide and 1-(N,N-dimethylamino)-hexyl-(6)-methacrylamide.

Representative examples of esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates; and polyalkylene glycol acrylates and methacrylates.

Representative examples of other ethylenically unsaturated polymerizable monomers include, without limitation, such compounds as fumaric, maleic, and itaconic anhydrides, monoesters, and diesters. Polyfunctional monomers may also be included to provide a partially crosslinked acrylic dispersion. Examples of polyfucntional compounds include, without limitation, ethylene glycol diacrylate, ethylene glycol dimethyacrylate, triethylene glycol diacrylate, tetraethylene glycol dimethacrylate, 1,6-hexanediol diacrylate, divinylbenzene, trimethylolpropane triacrylate, and so on.

Representative examples of vinyl monomers that can be copolymerized include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone.

After polymerization, the acid functionality is salted, preferably with an alkali or base, preferably an amine. Example of suitable salting materials include, without limitation, ammonia, monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine propylenediamine, ethylethanolamine, dimethylethanolamine, diethylethanolamine, 2-amino-2-methylpropanol, and morpholine. Preferred salting materials include 2-amino-2-methylpropanol and dimethylethanolamine.

The acrylic polymer is polymerized by emulsion polymerization in the presence of the polyurethane dispersion. Preferably, a nonionic or an anionic surfactant is used for the emulsion polymerization. Suitable surfactants include, without limitation, polyoxyethylenenonylphenyl ethers, polyoxyethylenealkylallyl ether sulfuric acid esters, amino and alkali salts of dodecylbenzenesulfonic acid such as the dimethylethanolamine salt of dodecylbenzenesulfonic acid and sodium dodecylbenzenesulfonic acid, and sodium dioctylsulfosuccinate.

The polymerization typically proceeds by free radical polymerization. The free radical source is typically supplied by a redox initiator or by an organic peroxide or azo compound. Useful initiators include, without limitation, ammonium peroxydisulfate, potassium peroxydisulfate, sodium metabisulfite, hydrogen peroxide, t-butyl hydroperoxide, dilauryl peroxide, t-butyl peroxybenzoate, 2,2'-azobis(isobutyronitrile), and redox initiators such as ammonium peroxydisulfate and sodium metabisulfite with ferrous ammonium sulfate. Optionally, a chain transfer agent may be used. Typical chain transfer agents include mercaptans such as octyl mercaptan, n- or tert-dodecyl mercaptan, thiosalicylic acid, mercaptoacetic acid, and mercaptoethanol; halogenated compounds; and dimeric alpha-methyl styrene.

The acrylic polymer can have weight average molecular weights of one million or more. The weight average molecular weight of the acrylic polymer is preferably from about 5,000 to about 5,000,000, more preferably from about 5000 to about 60,000, still more preferably from about 7500 to about 500,000, and even more preferably from about 10,000 to about 50,000. The method for determination of actual molecular weight of the acrylic polymer must take into account the presence of the polyurethane polymer, but otherwise can be done by usual methods or can be deduced from a similar polymer prepared without the presence of the polyurethane polymer.

The theoretical glass transition temperature of the acrylic polymer can be adjusted according to methods well-known in the art through selection and apportionment of the comonomers. The acrylic polymer has a glass transition temperature that is at least about 20° C. higher than the glass transition temperature of polyurethane resin. Preferably, the acrylic polymer has a glass transition temperature that is at least about 40° C. higher, more preferably about 50° C. higher, than the glass transition temperature of polyurethane resin. In a preferred embodiment, the theoretical $T_g$ of the acrylic polymer is between about −30° C. and 80° C., more preferably between about −20° C. and 40° C.

The polyurethane polymer may be included in the primer in an amount of at least about 40% by weight, preferably at least about 50% by weight, based on the combined nonvolatile weights of the polyurethane polymer and the acrylic polymer. The polyurethane polymer may be included in the primer in an amount of up to about 98% by weight, preferably up to about 80% by weight, based on the combined nonvolatile weights of the polyurethane polymer and the acrylic polymer. It is preferred to include from about 50% by weight to about 75% by weight, and even more preferred to include from about 65% by weight to about 75% by weight, of the polyurethane polymer, based on the combined nonvolatile weights of the polyurethane polymer and the acrylic polymer. The amounts can be adjusted with additional polyurethane dispersion containing no emulsion acrylic.

The compositions of the present invention also include a crosslinker component. The crosslinker component includes one or more crosslinkers reactive with active hydrogen functionality. Examples of crosslinkers reactive with active hydrogen functionality include, without limitation, materials having active methylol or methylalkoxy groups, including aminoplast resins or phenol/formaldehyde adducts; blocked polyisocyanate curing agents; tris(alkoxy carbonylamino) triazines (available from Cytec Industries under the tradename TACT); and combinations thereof. Suitable aminoplast resins are amine/aldehyde condensates, preferably at least partially etherified, and most preferably fully etherified. Melamine and urea are preferred amines, but other triazines, triazoles, diazines, guanidines, or guanamines may also be used to prepare the alkylated amine/aldehyde aminoplast resins crosslinking agents. The aminoplast resins are preferably amine/formaldehyde condensates, although other aldehydes, such as acetaldehyde, crotonaldehyde, and benzaldehyde, may be used. Non-limiting examples of preferred aminoplast resins include monomeric or polymeric melamine formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like. Monomeric melamine formaldehyde resins are particularly preferred. The preferred alkylated melamine formaldehyde resins are water miscible or water soluble. Examples of blocked polyisocyanates include isocyanurates of toluene diisocyanate, isophorone diisocyanate, and hexamethylene diisocyanate blocked with a blocking agent such as an alcohol, an oxime, or a secondary amine such as pyrazole or substituted pyrazole.

The crosslinker component preferably is from about 2% by weight to about 30% by weight, and more preferably from about 5% by weight to about 20% by weight, and particularly preferably about 5% to about 15% by weight of the combined nonvolatile weights of the polyurethane, the acrylic polymer, and the crosslinking component.

The compositions may include one or more catalysts. The type of catalyst depends upon the particular crosslinker component composition utilized. Useful catalysts include, without limitation, blocked acid catalysts, such as para-toluene sulfonic acid, dodecylbenzene sulfonic acid, and dinonylnaphthylene disulfonic acid blocked with amines; phenyl acid phosphate, monobutyl maleate, and butyl phosphate, hydroxy phosphate ester; Lewis acids, zinc salts, and tin salts, including dibutyl tin dilaurate and dibutyl tin oxide.

The primer coating compositions according to the invention may further include pigments such as are commonly used in the art, including color pigments, corrosion inhibiting pigments, conductive pigments, and filler pigments. Illustrative examples of these are metal oxides, chromates, molybdates, phosphates, and silicates, carbon black, titanium dioxide, sulfates, and silicas.

Other conventional materials, such as dyes, flow control or rheology control agents, and so on may be added to the compositions.

The primer composition has a very low content of volatile of organic solvent. The polyurethane dispersion is preferably prepared as a solvent free or substantially solvent free dispersion. By "substantially solvent free" it is meant that the dispersion has a volatile organic content of less than about 5% by weight of the primer composition. The polyurethane-emulsion acrylic dispersion is also preferably solvent free or substantially solvent free dispersion. The primer composition preferably has a volatile organic content of less than about 1.5, more preferably less than about 1.3, and even more preferably less than about 0.7. The volatile organic content of a coating composition is typically measured using ASTM D3960.

The coating compositions of the present invention can be applied over many different substrates, including wood, metals, glass, cloth, plastic, foam, metals, and elastomers. They are particularly preferred as primers on automotive articles, such as metal or plastic automotive bodies or elastomeric fascia. When the article is a metallic article, it is preferred to have a layer of electrocoat primer before application of the primer coating composition of the invention.

The composite coating of the invention has, as one layer, a primer coating layer that is obtained by reaction of the aqueous primer composition of the invention. The composite coating has a basecoat coating layer applied over the primer coating layer and an outer, clearcoat layer applied over the basecoat coating layer.

The primer coating composition of the invention is applied directly to the substrate or over one or more other layers of primer, such as the electrocoat primer. The applied primer coating composition is then cured to form a primer coating layer. The electrocoat primer or other first layer of primer may be cured at the same time as the primer coating layer of the invention in a process known as "wet-on-wet" coating. The primer coating layer formed from the primer coating composition of the invention is the outermost primer layer of the composite coating.

A topcoat composition is applied over the primer coating layer and cured to form a topcoat layer. The substrate at that point is then covered with a composite coating that has at least one layer of primer coating derived from the inventive compositions and at least one layer of topcoat. In a preferred embodiment, the coating composition of the present invention is overcoated with a topcoat applied as a color-plus-clear (basecoat-clearcoat) topcoat. In a basecoat-clearcoat topcoat, an underlayer of a pigmented coating, the basecoat, is covered with an outer layer of a transparent coating, the clearcoat. Basecoat-clearcoat topcoats provide an attractive smooth and glossy finish and generally improved performance.

Crosslinking compositions are preferred as the topcoat layer or layers. Coatings of this type are well-known in the art and include waterborne compositions as well as solventborne compositions. For example, the topcoat may be a clearcoat according to U.S. Pat. No. 5,474,811, applied wet-on-wet over a layer of a basecoat composition. Polymers known in the art to be useful in basecoat and clearcoat compositions include, without limitation, acrylics, vinyl, polyurethanes, polycarbonates, polyesters, alkyds, and polysiloxanes. Acrylics and polyurethanes are preferred. Thermoset basecoat and clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin of the kind described above. In one embodiment, waterborne basecoat compositions and/or clearcoat compositions having low volatile organic content are used. The waterborne basecoat and waterborne clearcoat compositions each preferably has a volatile organic content of less than about 1.5, more preferably less than about 1.3, and even more preferably less than about 0.7.

Each layer of the composite coatings of the invention can be applied to an article to be coated according to any of a number of techniques well-known in the art. These include, for example, spray coating, dip coating, roll coating, curtain coating, and the like. If an initial electrocoat primer layer is applied to a metallic substrate, the electrocoat primer is applied by electrodeposition. For automotive applications, the primer coating composition of the invention and the topcoat layer or layers are preferably applied by spray coating, particularly electrostatic spray methods. Coating layers of one mil or more are usually applied in two or more coats, separated by a time sufficient to allow some of the solvent or aqueous medium to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

The outermost primer layer, which is formed by reacting the primer compositions of the invention, may be cured by reaction of curing component with at least one the polyurethane resin or the acrylic resin before the topcoat is applied. The cured primer layer may be from about 0.5 mil to about 2 mils thick, preferably from about 0.8 mils to about 1.2 mils thick.

Color-plus-clear topcoats are usually applied wet-on-wet. The compositions are applied in coats separated by a flash, as described above, with a flash also between the last coat of the color composition and the first coat the clear. The two coating layers are then cured simultaneously. Preferably, the cured basecoat layer is 0.5 to 1.5 mils thick, and the cured clear coat layer is 1 to 3 mils, more preferably 1.6 to 2.2 mils, thick.

Alternatively the primer layer of the invention and the topcoat can be applied "wet-on-wet." For example, the primer composition of the invention can be applied, then the applied layer flashed; then the topcoat can be applied and flashed; then the primer and the topcoat can be cured at the same time. Again, the topcoat can include a basecoat layer and a clearcoat layer applied wet-on-wet.

The coating compositions described are preferably cured with heat. Curing temperatures are preferably from about 70° C. to about 180° C., and particularly preferably from about 170° F. to about 200° F. for a composition including an unblocked acid catalyst, or from about 240° F. to about 275° F. for a composition including a blocked acid catalyst. Typical curing times at these temperatures range from 15 to 60 minutes, and preferably the temperature is chosen to allow a cure time of from about 15 to about 30 minutes. In a preferred embodiment, the coated article is an automotive body or part.

The primer layer of the invention provides improved chip resistance as compared to previously known primers, while retaining the desirable properties of sandability and corrosion resistance. Further, the primer composition of the invention can be formulated to have low volatile organic content and even no volatile organic content.

The invention is further described in the following examples. The examples are merely illustrative and do not in any way limit the scope of the invention as described and claimed. All parts are by weight unless otherwise indicated.

EXAMPLES

Example 1

Polyurethane-Acrylic Emulsion

A mixture of 116.8 parts by weight of deionized water and 525 parts by weight of BAYHYDROL 140 AQ polyurethane dispersion (about 40% nonvolatile, 59% water, and 1% toluene, glass transition temperature of about −45° C., pH of about 6.0 to about 7.5, weight average molecular weight of about 25,000, anionic Desmodur W/1,6-hexamethylene diisocyanate/polyester polyol-based polyurethane, available from Bayer Corporation, Pittsburgh, Pa.) is loaded into a suitable reactor and heated to 82° C. Separately, 80 parts by weight of methyl methacrylate, 69 parts by weight of butyl acrylate, and 51 parts by weight of hydroxyethyl methacrylate are emulsified in 24.9 parts by weight of ABEX EP 110 (anionic surfactant available from Rhodia) and 107.55 parts by weight of deionized water. A mixture of 0.75 parts by weight of ammonium persulfate and 25 grams of water is added to the monomer mixture. The resulting monomer-initiator mixture is added to the reactor over a period of two hours. The product emulsion contains 21% by solid weight polyurethane and 20% by solid weight acrylic polymer.

Example 2

Primer Composition

A primer composition is prepared by first mixing together 33.35 parts by weight of the polyurethane-acrylic emulsion Example 1, 21.33 parts deionized water, and 40.89 parts by weight of pigment paste (63% by weight nonvolatile in water, nonvolatiles are 33.1% by weight of the polyurethane resin of BAYHYDROL 140 AQ, 33.1% by weight of titanium dioxide, 33.1% by weight of barium sulfate extender, and the balance carbon black, ground on a horizontal mill to a fineness of 6 microns). To this mixture were added 2.71 parts by weight of RESIMENE 747 (a melamine formaldehyde resin available from Solutia, St. Louis, Mo.) and 0.27 parts by weight of ABEX EP 110 (anionic surfactant available from Rhodia). A total of 1.39 parts by weight of an additive package (defoamer, wetting agent, and thickener) was then added. Finally, the pH of the primer composition was adjusted to about 8.0 with 2-amino-2-methylpropanol.

The primer composition is adjusted before spray application with deionized water to a viscosity of 75 to 110 centipoise.

The primer composition is applied to electrocoat primed 4"×12" steel panels and cured by baking for 30 minutes at 325° C. to form a primer layer of about 1 mil thickness. The cured primer is then topcoated with commercial basecoat and clearcoat compositions. The composite coating provides improved chip resistance.

The invention has been described in detail with reference to preferred embodiments thereof. It should be understood, however, that variations and modifications can be made within the spirit and scope of the invention.

What is claimed is:

1. A composite coating, comprising
   (a) a substrate;
   (b) at least one primer coating layer over said substrate that is obtained by curing a primer coating composition comprising:
      (i) a polyurethane polymer, said polyurethane polymer having a glass transition temperature of about 0° C. or less;
      (ii) a dispersed acrylic polymer polymerized in the presence of said dispersed polyurethane polymer, said acrylic polymer having a glass transition temperature that is at least about 20° C. higher than the glass transition temperature of said polyurethane polymer; and
      (iii) a crosslinking component that is reactive with at least one of the polyurethane polymer and the acrylic polymer;
   and
   (c) at least one topcoat layer over said primer coating layer.

2. A composite coating according to claim 1, wherein said substrate is metal or plastic.

3. A composite coating according to claim 1, wherein said topcoat layer comprises an inner basecoat layer and an outer clearcoat layer.

4. A composite coating according to claim 1, wherein said primer coating composition is over a layer of an electrocoat primer.

* * * * *